US009752904B2

(12) United States Patent
Zevenbergen et al.

(10) Patent No.: US 9,752,904 B2
(45) Date of Patent: Sep. 5, 2017

(54) ARRANGEMENT FOR PROVIDING INFORMATION ON FLUID FLOW RATE

(71) Applicant: Stichting IMEC Nederland, Eindhoven (NL)

(72) Inventors: Marcel Arie Günther Zevenbergen, Nuenen (NL); Rajesh Mandamparambil, Eindhoven (NL); Chuan Nie, Eindhoven (NL); Arnoldus Joannes Hubertus Frijns, Zwijndrecht (NL); Jacob Marinus Jan Den Toonder, Geldrop (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 15/159,221

(22) Filed: May 19, 2016

(65) Prior Publication Data

US 2016/0349090 A1  Dec. 1, 2016

(30) Foreign Application Priority Data

May 29, 2015  (EP) .................................... 15169954

(51) Int. Cl.
*G01F 1/00* (2006.01)
*B01L 3/00* (2006.01)
*G01F 1/68* (2006.01)

(52) U.S. Cl.
CPC .............. *G01F 1/00* (2013.01); *B01L 3/5027* (2013.01); *G01F 1/68* (2013.01)

(58) Field of Classification Search
CPC ........................................................ G01F 1/00
USPC ......................... 73/861.08; 429/413; 62/106
See application file for complete search history.

(56) References Cited

U.S. PATENT DOCUMENTS

2003/0014982 A1* 1/2003 Smith .................... C09K 5/047
  62/106
2007/0160883 A1* 7/2007 Darling ............. H01M 8/04029
  429/413

OTHER PUBLICATIONS

Nie, Chuan et al., "A Microfluidic Device Based on an Evaporation-Driven Micropump", Biomed Microdevices, vol. 17, Issue 2, Apr. 2015, pp. 1-12.

* cited by examiner

*Primary Examiner* — Jewel V Thompson
(74) *Attorney, Agent, or Firm* — McDonnell Boehnen Hulbert & Berghoff LLP

(57) ABSTRACT

The present disclosure relates to an arrangement for providing information about a flow rate of a fluid, comprising: a fluid inlet opening, at least one flow channel, and at least one porous zone located above the at least one flow channel, wherein the surface size and position of the at least one porous zone relative to the fluid inlet opening defines the evaporation rate of a fluid, arranged such that when a fluid is injected through the fluid inlet opening the fluid flows via hydraulic pressure through the at least one flow channel and then through the respective at least one porous zone.

20 Claims, 7 Drawing Sheets

ARRANGEMENT FOR PROVIDING INFORMATION ON FLUID FLOW RATE

CROSS-REFERENCE TO RELATED APPLICATIONS

The present application is a non-provisional patent application claiming priority to European Patent Application No. EP 15169954.3, filed May 29, 2015, the contents of which are hereby incorporated by reference.

FIELD OF THE DISCLOSURE

The present disclosure generally relates to flow rate meters and more specifically to arrangements for providing information about the flow rate of a fluid.

BACKGROUND

Microfluidic systems, such as lab-on-chip systems and microfluidic devices for biomedical detection systems, have been recently proposed which combine silicon chip packaging and flexible electronics technology. Such systems can be used for example as wearable sensor systems, such as sweat sensor patches and wound patches for fluid analysis and monitoring. Recent works describe such systems where a microfluidic micropump device is used to provide a microfluidic transportation (i.e. a continuous fixed fluid flow) for example from the fluid reservoir to the sensor system. Recent works describe micropump devices using a combination of evaporation and capillarity that run passively for a long time and that can be realized at reduced production cost and with simple processes and materials.

C. Nie et. al. describe in "*A microfluidic device based on an evaporation-driven micropump*" (Biomedical Microdevices (2015), vol. 17, issue 2, April 2015) an evaporation-driven micropump, which can be used to provide a continuous flow through a microfluidic channel. The micropump device is characterized with a fluid inlet and a fluid outlet. When a fluid is provided through the micropump device, it flows through the channel and evaporates through the fluid outlet. The fluid outlet is covered with a micro-porous membrane, which is designed such that the micropump device pumps the fluid through the channel by evaporating through the outlet with a fixed flow rate. To achieve a fixed flow rate the micro-porous membrane covering the outlet is designed to provide an evaporation rate exactly equal to the desired flow rate. In other words, the evaporation rate through the micro-porous membranes defines the flow rate with which the fluid is pumped through the micropump device.

However, there is a need for a microfluidic device which is able to provide information about the fluid flow rate. This is especially important where for sweat sensing applications or for other applications for which the readout performance is affected by the fluid flow rate.

SUMMARY

It is an object of embodiments of the present disclosure to provide for a microfluidic device that can provide fluid flow rate information.

The above objective is accomplished by the solution according to the present disclosure.

In a first aspect the disclosure relates to an arrangement for providing information about a flow rate of a fluid, comprising: a fluid inlet opening, at least one flow channel, and at least one porous zone located above the flow channel, wherein the surface size and position of the at least one porous zone relative to the fluid inlet opening defines the evaporation rate of a fluid, arranged such that when a fluid is injected through the fluid inlet opening it flows via hydraulic pressure through the at least one flow channel and then through the respective at least one porous zone.

In one embodiment the distance between adjacent porous zones is such that the flow rate of the fluid is about equal to the fluid's evaporation rate.

In one embodiment the arrangement comprises a stack of layers, wherein the stack of layers comprises: a top layer defining the at least one porous zone, a middle layer defining the at least one flow channel and a bottom layer serving as a substrate layer, and wherein the fluid inlet opening is defined in the top layer, in the middle layer or in the bottom layer.

In one embodiment the at least one porous zone comprises at least one opening having a hydraulic diameter smaller than a capillary length between the fluid and a gas medium, and, wherein the distance between adjacent porous zones is larger than the diameter of the at least one opening.

In one embodiment the hydraulic diameter of the at least one opening is at least about 2 μm and at most about equal the capillary length between the fluid and the gas medium.

In one embodiment the hydraulic diameter of the flow channel is at least equal to the surface area of the at least one porous zone.

In one embodiment the hydraulic diameter of the flow channel is smaller than the capillary length between the fluid and a gas medium.

In one embodiment the flow channel is coupled to at least one reservoir, wherein the dimensions of at least one reservoir are such that its surface at least equals the surface area of the at least one porous zone. The part of the channel underneath a porous zone is referred to as a reservoir.

In one embodiment the top layer has a height less than the diameter of the at least one opening.

In one embodiment the at least one flow channel has a straight or a meandering shape.

In one embodiment the top layer and the middle layer are combined in a single layer, or the middle layer and the bottom layer are combined in a single layer, or the top layer, the middle layer and the bottom layer are combined in single layer.

In one embodiment each layer is made of a microfabricatable material, such as polyethylene terephthalate, silicon, glass, thermoplastic material or metal.

In a second aspect the present disclosure relates to microfluidic system comprising an arrangement according to the present disclosure.

In a third aspect the present disclosure relates to a method for determining a flow rate of a fluid, the method comprising the steps of: providing a fluid in an arrangement as previously described through an inlet opening so that the fluid flows via hydraulic pressure through the at least one flow channel and inside the at least one reservoir and then through the respective at least one porous zone, determining a flow rate of the fluid by counting a number of porous zones wherein the fluid is observed.

For purposes of summarizing the disclosure and the advantages achieved over the prior art, certain objects and advantages of the disclosure have been described herein above. Of course, it is to be understood that not necessarily all such objects or advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein.

The above and other aspects of the disclosure will be apparent from and elucidated with reference to the embodiment(s) described hereinafter.

BRIEF DESCRIPTION OF THE FIGURES

The disclosure will now be described further, by way of example, with reference to the accompanying drawings, wherein like reference numerals refer to like elements in the various figures.

DETAILED DESCRIPTION

Figure 1:
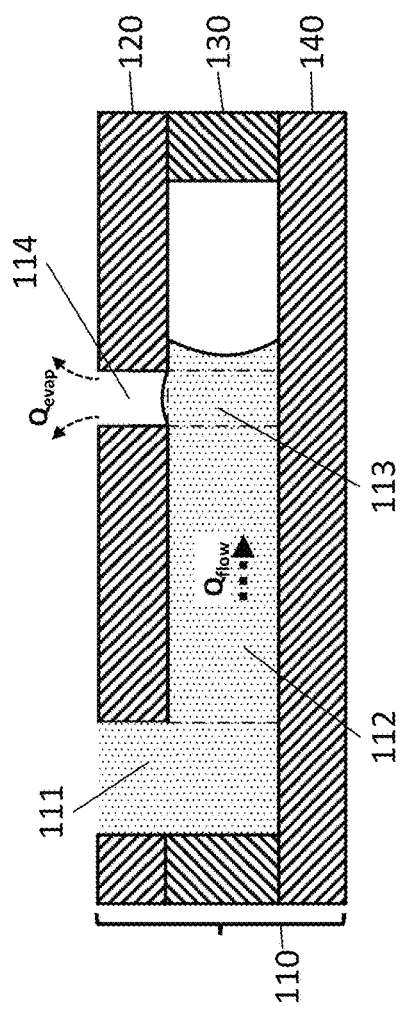
FIG. 1 illustrates a cross-sectional view of a microfluidic arrangement for providing information about a fluid flow rate according to an exemplary embodiment.
Figure 2:
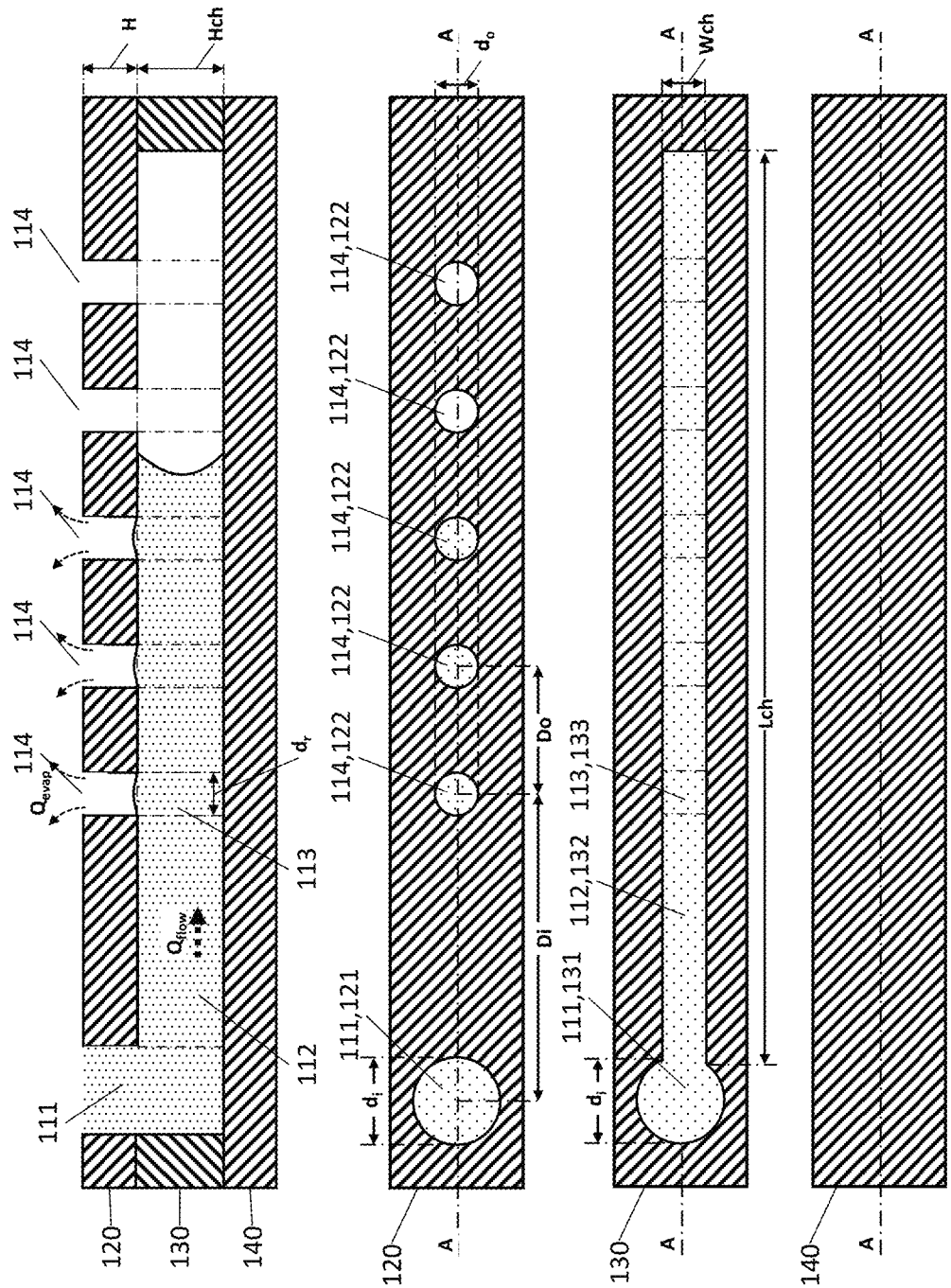
FIG. 2 illustrates a cross-sectional view and a top view of a microfluidic arrangement for providing information about a fluid flow rate according to an exemplary embodiment.

The present disclosure will be described with respect to particular embodiments and with reference to certain drawings but the disclosure is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more aspects described herein. This method of disclosure, however, is not to be interpreted as reflecting an intention that the claimed disclosure requires more features than are expressly recited in each claim. Rather, as the following claims reflect, various aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

The present disclosure relates to an arrangement for providing information about a fluid flow rate, as shown in FIG. 1. The arrangement capitalizes on the combination of fluid evaporation and inlet pressure which drive a fluid through a flow channel and a porous zone, causing their gradual filling with the fluid. The arrangement comprises a fluid inlet opening 111, a flow channel 112 and at least one porous zone 114 located along and above the flow channel, wherein the size and position of the porous zone 114 relative to the fluid inlet opening 111 defines an evaporation rate of a fluid. Thus, when fluid enters through the inlet opening 111, it flows via hydraulic pressure at the inlet through the channel 112 and then through the porous zone 114. Depending on the fluid flow rate, the porous zone 114 can be empty, partly filled or fully filled with the fluid flowing through the flow channel. Optionally, the flow channel 112 may be coupled (i.e. fluidically connected) to at least one reservoir 113, wherein the reservoir is located underneath (or below) a respective porous zone. Such an arrangement may arise, for example, when the flow channel 112 is narrower than the surface area of the porous zone.

The fluid can be provided into the inlet opening 111 by, for example, a microfluidic micro-pump or by an absorbing layer (e.g. a laser cut filter paper) collecting fluid (e.g. from the skin) with a hydraulic pressure. When the fluid enters the flow channel 112, the fluid meniscus moves forward (or propagates) through the channel 112 towards the reservoir 113. When a reservoir is filled with fluid, the geometry of the reservoir causes the menisci to be pinned at the porous zone 114 located above the reservoir (as shown by the dashed arrows) and further along the flow channel 112. As shown in the figure, the capillary pressure may cause partial or full filling of the porous zones 114. The meniscus of the fluid gradually propagates through, thus gradually filling the flow channel and thereby filling more porous zones with fluid, until the total fluid's flow rate, Qflow, is equal to the fluid's evaporation rate, Qevap. Once equilibrium between the Qflow and the Qevap is reached, the meniscus of the fluid in the channel 112 stops moving forward (stops propagating further down the channel). Depending on the flow rate, a reservoir and the respective porous zone can be empty, partially or fully filled with the fluid. Thus, by observing up to which porous zone the arrangement is filled with fluid, information about the fluid flow rate can be derived. As a result, the dimensions (i.e., the geometry) and position of the porous zones along the channel and relative to each other, define the resolution (i.e. the precision of the information) and the range with which the flow rate can be measured, can be altered, respectively. Thus, by changing the size of the porous zone and the distance between adjacent porous zones the measurement resolution and range can be altered.

For example for an arrangement comprising one porous zone, i.e. comprising one porous opening, as shown in FIG. 1, wherein the porous zone has a specific size and position along the channel such that the fluid evaporation rate of the porous zone is e.g. 50 nanoliter/min. Thus, if the first porous zone is partially wetted, then the flow rate is between 0 and 50 nanoliter/min, and if it is fully wetted (i.e. the fluid evaporates through the porous zone to a gas medium, for example air) then the fluid flow rate is larger than 50 nanoliter/min. The arrangement, thus, provides information about the fluid flow rate within a range of 0-50 nanoliter/min with a resolution of 50 nanoliter/min.

More in detail, the arrangement 100 comprises a stack of layers 110 which forms the fluid inlet opening 111, the flow channel 112 and the porous zone 114. Optionally, the channel 112 may be coupled (fluidically connected) to a reservoir 113, wherein the reservoir is positioned underneath the porous zone. The stack of layers 110 comprises three layers. A top layer 120 provided with a first through-opening 121 defines at least one second through-opening 122 defining the porous zone 114. A middle layer 130 has at least one elongated opening 131 defining the flow channel 112. A bottom layer 140 serves as a substrate layer. The fluidic inlet 111 maybe defined by a through-opening in the top 120 (as shown in FIG. 1), or, alternatively, in the middle 130 or the bottom layer 140.

The resolution of the flow rate information provided by the proposed arrangement is thus defined by the design specifics of the porous zone 114, i.e. the size (its surface area, which is defined by the hydraulic diameter $d_o$ of a porous zone, and its height, $h_o$), the number and the distance between openings 122 in the porous zone.

Hydraulic diameter, $d_o$, of the porous opening 122 may be in the range 10-800 μm. In an example embodiment, the hydraulic diameter is 250 μm. The maximum hydraulic diameter may be restricted by the size of the arrangement 100, which may be restricted to 20 cm in diameter.

The range of the flow rate information provided by the proposed arrangement depends on the total number of porous zones and their geometrical distribution, namely the distance between them and the geometry of each zone, which in turn defines the evaporation rate, Qevap, of each zone.

A secondary factor affecting the flow rate resolution is the environmental conditions, such as temperature and surrounding liquid vapour concentration in gas, e.g. humidity for the case of water in air, since they affect the evaporation rate of a water-air interface.

In some embodiments the flow channel 112 can be fluidically connected to at least one widened portion 133, thereby forming at least one reservoir 113 along the flow channel. In this embodiment the porous zone 114 should be located above the reservoir 113.

The dimension of the inlet opening 111 allows a fluid injection into the arrangement by, for example, a microfluidic micro-pump device, a syringe or any other suitable for the purpose device. The size of the fluid inlet 111, i.e. its geometric shape, and its location relative to the at least one porous zone 113 does not influence the functionality of the arrangement 100 and thus neither the flow rate of the fluid. Its only functionality is allowing injection of a fluid into the arrangement 100. Practically, however, the at least one porous zone should be located at a sensible distance from the inlet opening, for example, at a distance, Di, in the range between 0.5 cm and 5 cm.

In some embodiments the through-opening 122 has a hydraulic diameter, $d_o$, smaller than the capillary length between the fluid and a gas medium in which the arrangement 100 is provided. An example of a gas medium is air and an example of a fluid is water, salty water, etc. The capillary length of a water-air interface at 20° C. temperature is about 2.7 mm. The distance, Do, between the at least one opening 122 (i.e. the centre-to-centre distance between adjacent openings 122) is larger than the diameter, $d_o$, of the opening 122 and, in some embodiments, at least about 2 μm. Any type of large is fine, the maximum values may be restricted by the size of the arrangement 100. For example, a sensible distance, Do, may be about 20 cm.

In some embodiments the width/diameter of the flow channel 112, Wch, is smaller than the capillary length between the fluid and a gas medium, for example water and air. Alternatively, the width of the flow channel 112 is so that the area is at least equal to the surface area of the porous zone 114. If the porous zone is cone-shaped the Wch should be such that the area at least equals the surface area of the porous zone facing the reservoir.

In some embodiments the flow channel 112 is coupled (i.e. fluidically connected) to at least one reservoir 113. The reservoir 113 is placed along the flow channel and underneath a porous zone. The dimensions of the reservoir are such that it has an area at least equal to the surface area of the porous zone 114.

The flow channel 112 may be of a rectangular, a circular shape or any other shape with a hydraulic diameter, Wch, (i.e. the cross-section of the channel perpendicular to the direction of the fluid flow) not larger than the capillary length between the fluid and the gas medium. In an example embodiment, the diameter of the flow channel is about the capillary length, as this improves the response time of the arrangement, i.e. the fluid propagates faster through the channel, thus filling it faster with fluid the respective porous zone. In addition, the channel 112 may have a straight or a meandering shape. The flow channel may split into multiple flow sub-channels, wherein each sub-channel may be provided with a reservoir at its end.

In one embodiment the top layer 120 has a height, H, less than the diameter, $d_o$, of the at least one opening 122.

In some embodiments the middle layer 130 and the bottom layer 140 are combined in a single layer. In this embodiment, the layer can be etched to a certain depth to form the flow channel 112,132 and the respective channel reservoirs 131,133. Alternatively, the top layer 120 and the middle layer 130 are combined in a single layer. In this implementation both the top and the bottom surface of the layer should be etched to form the fluid inlet, the flow channel, the reservoirs and the respective porous zone placed or, all the three layers, the top layer, the middle layer and the bottom layer are combined in single layer. In these embodiments, the fluid inlet 111, the flow channel and the porous zone can be manufactured using conventional manufacturing techniques, such as laser cutting, etching technologies, powder blasting, molding techniques etc.

In some embodiments the arrangement 100 can be manufactured by using any microfabricatable material, such as a polyethylene terephthalate (PET) material. For example, each layer of the stack of layers 110 can be made of a thin PET layer. In an embodiment, the PET material is a flexible PET material. In an example embodiment, the middle layer can be made of adhesive PET layer, and thus binding the individual layers (120,130,140) into a stack 110. Instead of PET material, other polymers, glass, metal or silicon (Si) material can also be used for the manufacturing of the proposed arrangement. Any conventional technique can be used for the manufacturing of the arrangement, such as conventional etching techniques in case silicon material is used, a femtosecond laser machining in case a glass material is used, a micro milling technique in case of a metal material, etc.

Figure 3:
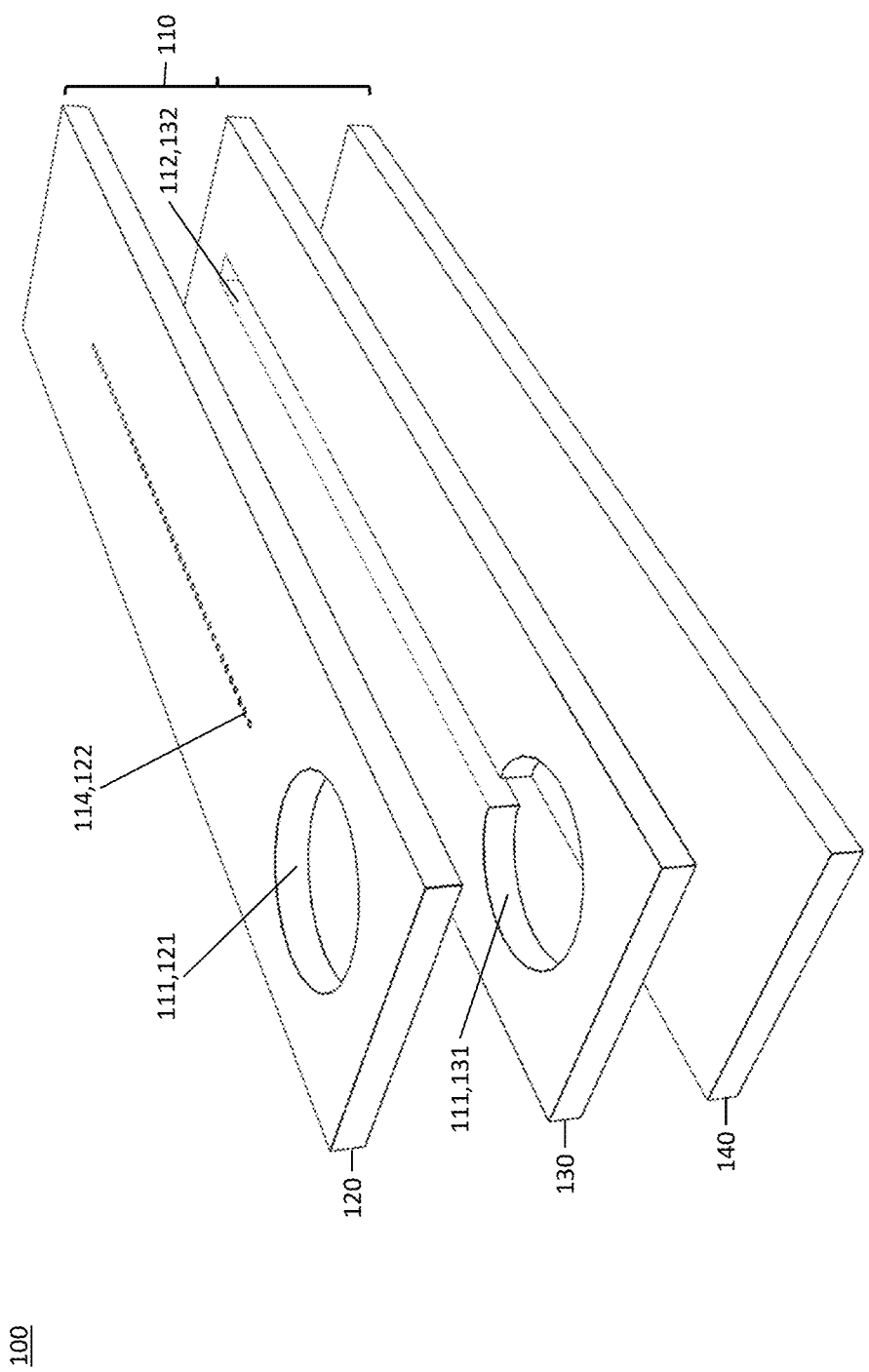
FIG. 3 illustrates an arrangement for providing information about a fluid flow rate according to an exemplary embodiment.

FIG. 3 illustrates a microfluidic arrangement for providing information about a flow rate of a fluid according to a first exemplary embodiment. The arrangement 100 is provided with a fluid inlet opening 111, a flow channel 112 and a plurality of porous zones 114 arranged in series and along the flow channel, wherein each porous zone comprises one porous opening 122. In this embodiment, the channel is so dimensioned that its area substantially equals the surface area of the porous opening. The porous zones are arranged along and above the flow channel 112 such that when a fluid is provided through the fluid inlet opening 111, the fluid via the injection pressure at the inlet 111 flows through the channel 112 and then through the opening 122 of a respective porous zone 114. The channel 112 may have a straight or meandering shape.

The meniscus in the flow channel stops moving when the evaporation rate, Qevap, through the respective porous zones 114 equals the fluid flow rate. Thus, by counting the number of porous zones filled (fully or partially) with fluid, the flow rate of fluid can be determined. For example, for specific conditions (i.e. temperature and humidity) and for a specific porous zone design (for certain size and position) the fluid evaporation rate, Qevap, of each porous zone can be set to about 7 nL/min. Thus, if only one porous zone 114 (i.e. the first porous zone positioned closest to the inlet opening) is filled with fluid the flow rate is in between 7-14 nL/min, if two porous zones are filled with fluid, the flow rate is between 14-21 nL/min and so on, when the distance between two adjacent porous zones is one order of magnitude larger than the its surface area, which in this embodiment is the diameter of the porous opening. Thus, for example, the fluid flow rate can be determined with a resolution smaller than 7 nL/min.

This embodiment provides the highest resolution when the number of the porous openings in each respective zone is small, e.g. only one or two porous openings.

Figure 4:
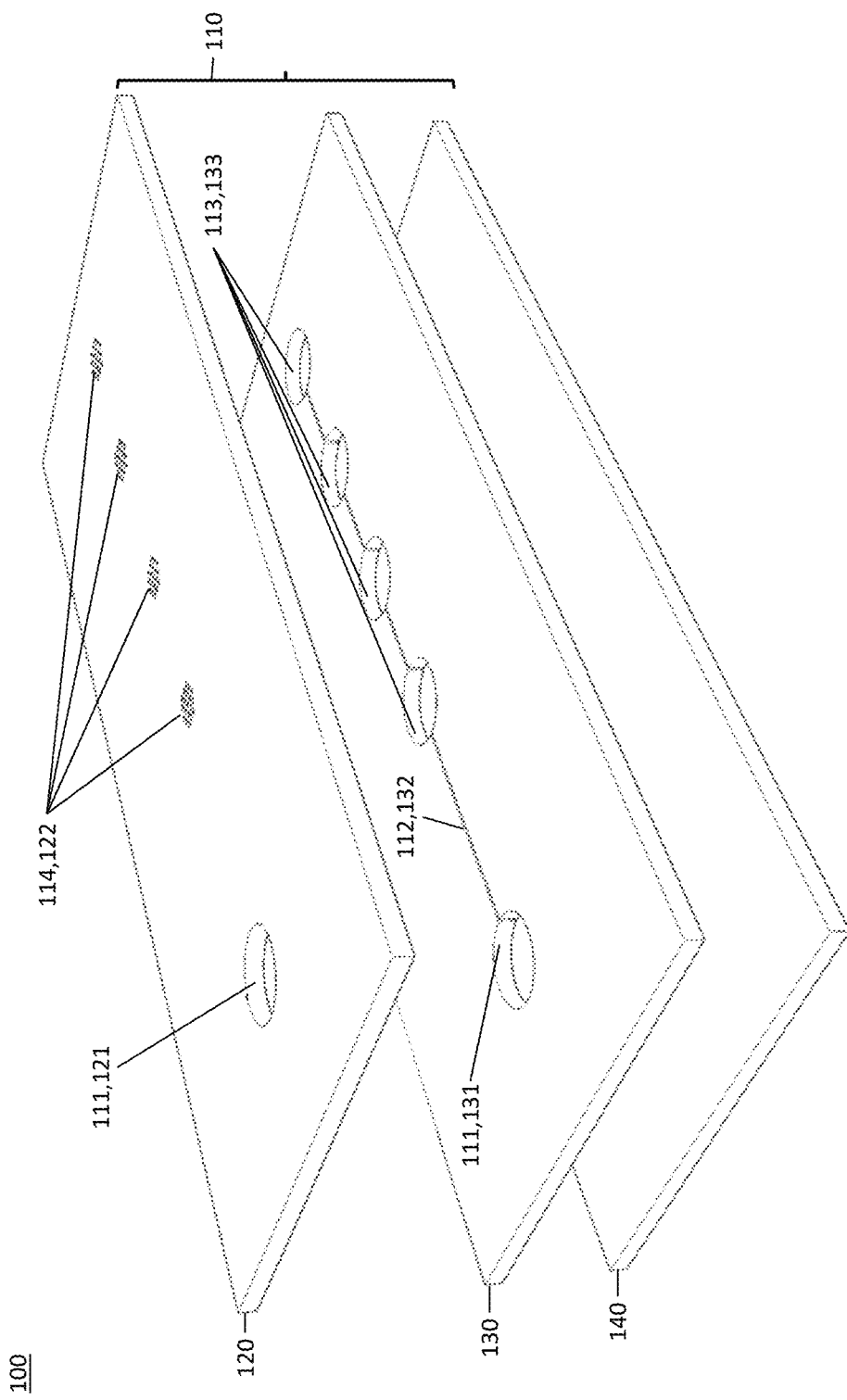
FIG. 4 illustrates an arrangement for providing information about a fluid flow rate according to an exemplary embodiment.

FIG. 4 illustrates a microfluidic arrangement for providing information about a flow rate of a fluid according to a second exemplary embodiment. In this embodiment each porous zone 114 comprises a plurality of porous openings 122. The porous opening 122 can be for example, arranged in a regular hexagonal arrangement. Similarly to the first embodiment, the porous zones 114 are arranged in series and along the flow channel. The width of the channel, Wch, is smaller than the capillary length between the fluid and the gas medium. The channel 112 may have a straight or meandering shape. The channel is fluidically connected to a plurality of reservoir 113, which are located under each porous zone 114. Thus, when a fluid enters through the inlet opening 111, the fluid flows through the channel 112 in the direction towards to the last reservoir. As the channel fills in with fluid, some of the reservoirs and their respective porous zones fill in with fluid. Similarly to the first embodiment, information about the fluid flow rate can be obtained by observing the number of (fully or partially) filled porous zones. Again, the resolution is defined by the design specifics of the porous zone 114 (i.e. the porous zone geometry which is defined by the number of porous opening in a zone and the hydraulic diameter of the opening, and by the distance between porous zones 114), and the range of the flow rate by the number and distance between of porous zones Do.

Alternatively, the flow channel 112 can have a width, Wch, such that its area is at least equal to the surface area of the porous zones 114.

The distance between porous openings (the centre-to-centre distance) in a porous zone should be larger than the diameter of a porous opening, such as two times larger than the diameter of the porous opening.

In comparison to the first exemplary embodiment, this embodiment provides a larger range, but a lower resolution. In addition, it allows for a simplified detection of whether a porous zone is filled with fluid or not. As this embodiment has porous zones, each with a plurality of porous openings, detection only in fewer places in a zone is enough to detect whether it is filled with fluid or not. However, in the case of the first embodiment shown FIG. 3, which has porous zones with only one opening, detection is required in every single opening. Therefore the detection in the second embodiment is simpler in comparison to the first one. However, as a consequence, the resolution provided by the second embodiment is lower.

Figure 5:
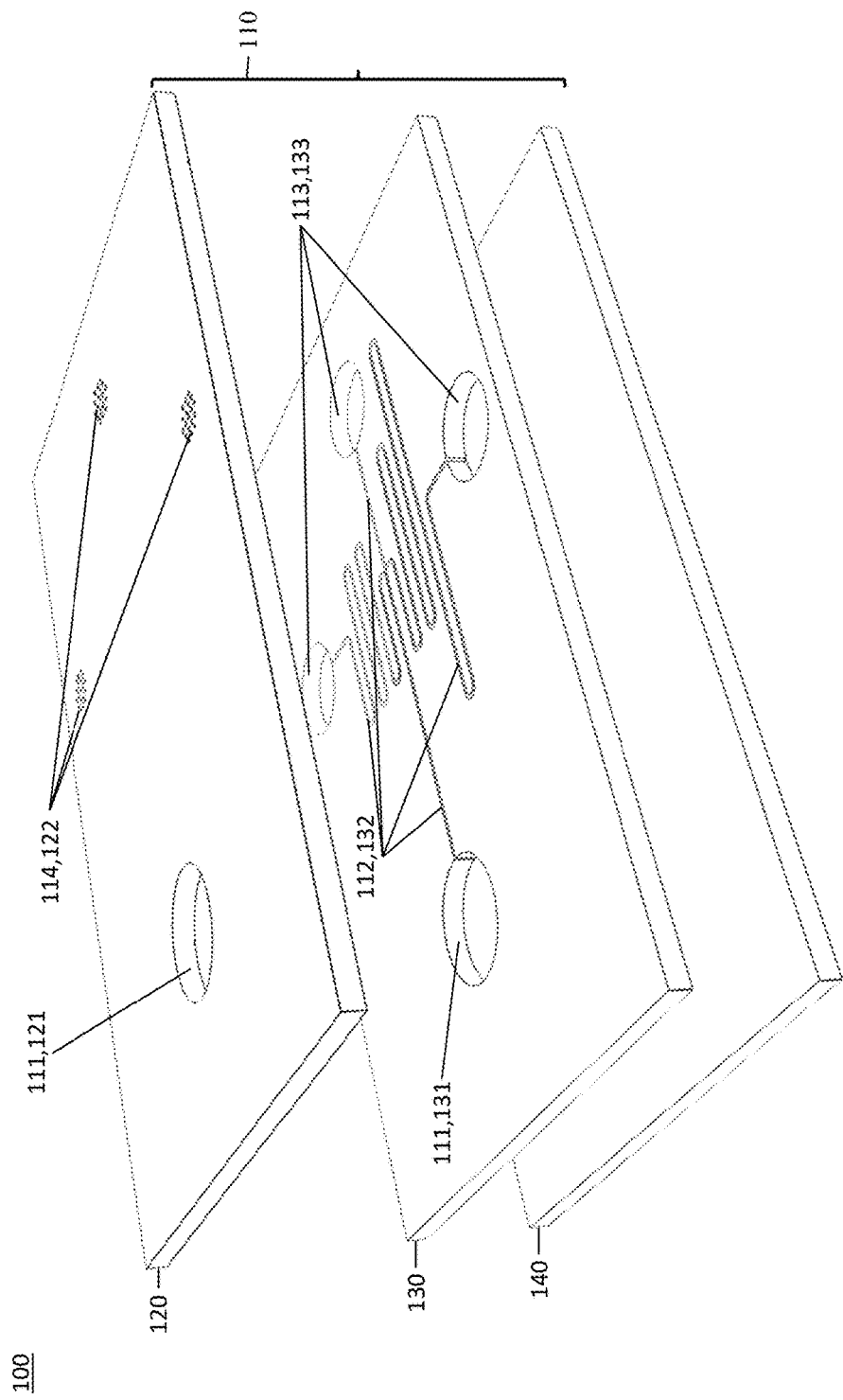
FIG. 5 illustrates an arrangement for providing information about a fluid flow rate according to an exemplary embodiment.

FIG. 5 illustrates a microfluidic arrangement for providing information about a flow rate of a fluid according to a third exemplary embodiment. In this embodiment, each porous zone 114 comprises a plurality of porous openings 122. The porous openings 122 can be, for example, arranged in a regular hexagonal arrangement. The porous zones are arranged in parallel or distributed over the surface of the top layer. The flow channel comprises a plurality of sub-channels, wherein each sub-channel is provided with a porous zone 114 at its end. Each sub-channel may have a straight or meandering shape. The porous zones gradually filled in with fluid depending on their flow resistance. Thus, the first zone 114 with the lowest flow resistance starts to fill first, followed by the zones with higher resistance. The last porous zone to fill is the one with the highest flow resistance. The flow rate of the fluid can be determined by counting the number of fully filled porous zones as in the previous embodiments. Similarly, the resolution is determined by the geometry (pore diameter, number and pitch in one zone) and the distance between porous zones 114, and the range of the flow rate by the number and distance between of porous zones.

This embodiment as well as the second embodiment achieve a larger range and easier detection compared to first exemplary embodiment. Comparing with the second embodiment, the pressure drop in the arrangement 100 is reduced and thus offers a more accurate measurement when more porous zones are added.

Figure 6:
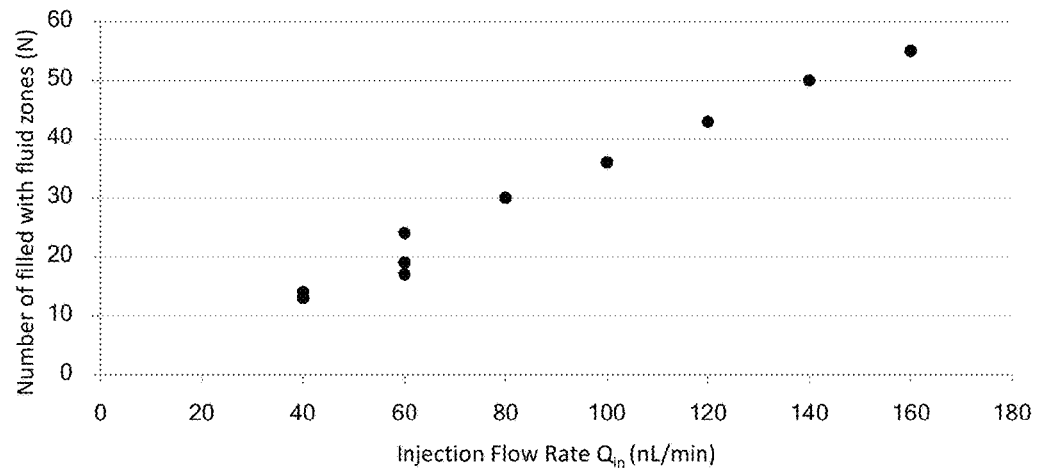
FIG. 6 shows measurement results using the microfluidic arrangement of FIG. 3.
Figure 7:
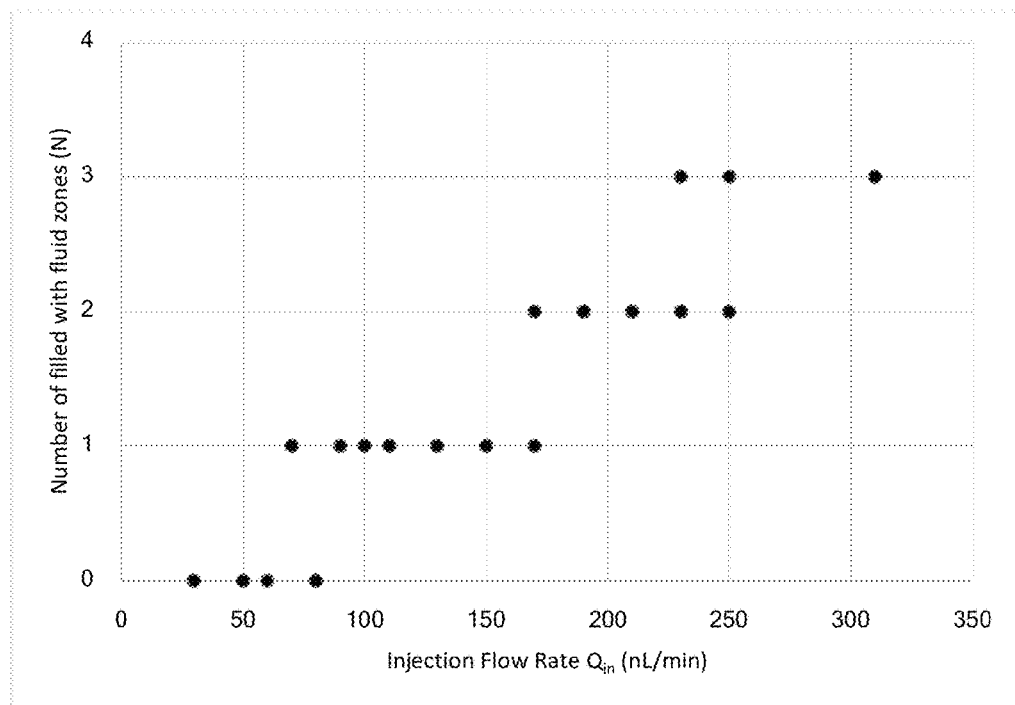
FIG. 7 shows measurement results using the microfluidic arrangement of FIG. 4.
Figure 8:
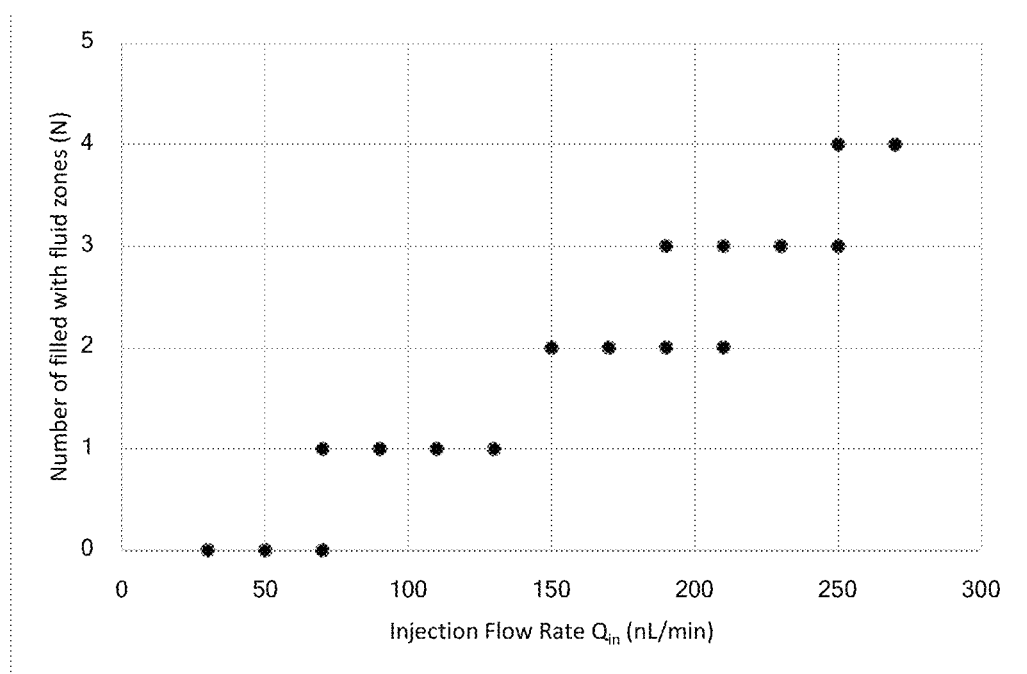
FIG. 8 shows measurement results using the microfluidic arrangement of FIG. 5.

Experiment results for each respective embodiment shown in FIGS. 3 to 5 are depicted in FIGS. 6 to 8, respectively. More in detail, FIGS. 6 to 8 plot the number of filled with fluid porous zones versus the injection flow rate, i.e. the flow rate with which the fluid is injected into the arrangement 100. In these experiments the injection flow rate is precisely controlled using a syringe pump. The experiments have been performed under normal environment conditions, i.e. temperature 20-21° C., relative humidity (RH) 0.45-0.55. The information provided by the arrangement 100, i.e. the number of filled zones, can then be translated to a measured flow rate. For example, if the distance between porous zones is one order of magnitude larger than the hydraulic diameter of the porous zone, the fluid flow rate Qflow can be approximated as a linear combination (summation) of the evaporation rate of the zones filled with fluid. That is, $Qflow=\Sigma_i^N Qevap_i$, where $Qevap_i$ is the evaporation rate of a respective porous zone and i the number of filled zones. If the ratio between distance and size of a porous zone is different, the above relation is non-linear, $Qflow=\Sigma_i^N Qevap_i=\Sigma_i^N cf_i$, where c is the flow rate of a porous zone and f is a parameter of which the value is a function of the porous zone's geometry, which is defined by the zone's position and its hydraulic diameter $d_o$. Thus, the value of f varies with the number of filled zones.

FIG. 6 shows the number of filled zones for the embodiment of FIG. 3. A clear increase of the number of filled zones is observed in line with the increase of the injection flow rate. For the implementation shown in FIG. 7 and FIG. 8 corresponding to embodiments of FIGS. 4 and 5, respectively, where the number of fully filled zones also increases stepwise with the increase of the injection flow rate. A comparison with FIG. 6 shows that the latter has a better resolution. Using the equation above, the flow rate measured by the arrangement can be calculated. Thus, the experiment results show that there is a good agreement between the actually measured flow rate and the injection flow rate. There is a small deviation between the experiment results and injection flow rate values, which may be caused by the evaporation through the empty porous zones from the front meniscus.

Detecting whether a porous zone has been fully filled with fluid can be performed, for example, visually or by using, for example, a pair of electrodes which may be located inside the channel before, under or after a porous zone. Once the electrodes are in contact with the fluid, a change in an electrical parameter, such as a capacitive change or a voltage change, can be measured which in turn allows determining whether a porous zone has been filled fully with fluid. Multiple pairs of electrodes can be used per porous zone. Other possible methods known in the art can be used as well.

In some embodiments the present disclosure relates to a microfluidic system comprising an arrangement for providing information about a flow rate of a fluid according to the present disclosure. The microfluidic system may further comprise at least one sensor device. Depending on the sensor device, the microfluidic system may be used for measuring for example, pH, Ca, Cl, Na ions, ammonia, glucose, lactate, etc. The system can be fabricated at low cost as the complete system can be manufactured using, for example, foil technology or 3D printing.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An arrangement for providing information about a flow rate of a fluid, comprising:
   a fluid inlet opening;
   at least one flow channel; and
   at least one porous zone located above the at least one flow channel, wherein a surface size and position of the at least one porous zone relative to the fluid inlet opening defines an evaporation rate of a fluid,
   arranged so that when a fluid is injected through the fluid inlet opening the fluid flows via hydraulic pressure through the at least one flow channel and then through the respective at least one porous zone.

2. The arrangement for providing information about a flow rate of a fluid as in claim 1, wherein a distance between at least two adjacent porous zones of the porous zones, Do, provides that the flow rate of the fluid, Qflow, is about equal to an evaporation rate of the fluid, Qevap.

3. The arrangement for providing information about a flow rate of a fluid as in claim 1, comprising a stack of layers, wherein the stack of layers comprises:
   a top layer defining the at least one porous zone, a middle layer defining the at least one flow channel and a bottom layer serving as a substrate layer, and wherein the fluid inlet opening is defined in the top layer, in the middle layer, or in the bottom layer.

4. The arrangement for providing information about a flow rate of a fluid as in claim 1, wherein the at least one porous zone comprises at least one opening having a hydraulic diameter, $d_o$, smaller than a capillary length between the fluid and a gas medium, and, wherein the distance between adjacent porous zones, Do, is larger than the hydraulic diameter of the at least one opening.

5. The arrangement for providing information about a flow rate of a fluid as in claim 4, wherein the hydraulic diameter, $d_o$, of the at least one opening is at least 2 μm and at most equal to the capillary length between the fluid and the gas medium.

6. The arrangement for providing information about a flow rate of a fluid as in claim 1, wherein the at least one flow channel has a hydraulic diameter, $d_o$, which is at least equal to a surface area of the at least one porous zone.

7. The arrangement for providing information about a flow rate of a fluid as in claim 1, wherein the at least one flow channel has a hydraulic diameter, $d_o$, which is smaller than a capillary length between the fluid and a gas medium.

8. The arrangement for providing information about a flow rate of a fluid as in claim 6, wherein the at least one flow channel is coupled to at least one reservoir, wherein dimensions of the at least one reservoir provide that its surface is at least equal to the surface area of the at least one porous zone.

9. The arrangement for providing information about a flow rate of a fluid as in claim 7, wherein the flow channel is coupled to at least one reservoir, the dimensions of the at least one reservoir providing that its surface at least equals the surface area of the at least one porous zone.

10. The arrangement for providing information about a flow rate of a fluid as in claim 3, wherein the top layer has a height, H, less than the hydraulic diameter, $d_o$, of the at least one opening.

11. The arrangement for providing information about a flow rate of a fluid as in claim 1, wherein the at least one flow channel has a straight or a meandering shape.

12. The arrangement for providing information about a flow rate of a fluid as in claim 3, wherein the top layer and the middle layer are combined in a single layer, or, wherein the middle layer and the bottom layer are combined in a single layer, or, wherein the top layer, the middle layer and the bottom layer are combined in single layer.

13. The arrangement for providing information about a flow rate of a fluid as in claim 3, wherein each layer is made of a microfabricatable material, and wherein the microfabricatable material comprises: polyethylene terephthalate, silicon, glass, thermoplastic material, or metal.

14. A microfluidic system comprising the arrangement for providing information about a flow rate of a fluid as in claim 1.

15. The microfluidic system as in claim 14, further comprising at least one sensor device.

16. The microfluidic system as in claim 15, wherein the at least one sensor device is configured to detect at least one of: pH, Ca ions, Cl ions, Na ions, ammonia, glucose, or lactate.

17. A method for determining a flow rate of a fluid, the method comprising:

providing a fluid in an arrangement for providing information about a flow rate of a fluid as in claim 1 through an inlet opening so that the fluid flows via hydraulic pressure through the at least one flow channel and inside the at least one reservoir and then through the respective at least one porous zone; and determining a flow rate of the fluid by counting a number of porous zones wherein the fluid is observed.

18. The method as in claim 17, wherein the arrangement for providing information about a flow rate of a fluid further comprises at least two electrodes arranged in the at least one flow channel, and wherein counting the number of porous zones comprises measuring an electrical parameter via the at least two electrodes and determining a change in the electrical parameter based on the measurement.

19. The method as in claim 18, wherein the electrical parameter comprises a capacitance or a voltage.

20. The arrangement for providing information about a flow rate of a fluid as in claim 1, wherein the at least one porous zone comprises a plurality of porous zones, wherein the plurality of porous zones is arranged in a regular hexagonal arrangement.

* * * * *